US 8,095,392 B1
Jan. 10, 2012

(12) United States Patent
Owen

(10) Patent No.: US 8,095,392 B1
(45) Date of Patent: Jan. 10, 2012

(54) SYSTEM, METHOD AND COMPUTER PROGRAM PRODUCT FOR FACILITATING INFORMED DECISIONS RELATING TO FAMILY RISK

(76) Inventor: Daniel L. Owen, Los Altos, CA (US)

( * ) Notice: Subject to any disclaimer, the term of this patent is extended or adjusted under 35 U.S.C. 154(b) by 906 days.

(21) Appl. No.: 11/336,070

(22) Filed: Jan. 20, 2006

Related U.S. Application Data

(60) Provisional application No. 60/646,186, filed on Jan. 20, 2005.

(51) Int. Cl.
*G06Q 40/00* (2006.01)
(52) U.S. Cl. .......................................................... 705/4
(58) Field of Classification Search .................. 705/4, 2
See application file for complete search history.

(56) References Cited

U.S. PATENT DOCUMENTS

| | | | | |
|---|---|---|---|---|
| 4,435,769 A | 3/1984 | Nagano et al. | ................. | 364/464 |
| 4,789,928 A | 12/1988 | Fujisaki | ........................ | 364/401 |
| 4,799,156 A | 1/1989 | Shavit et al. | ................... | 364/401 |
| 4,887,208 A | 12/1989 | Schneider et al. | ............. | 364/403 |
| 4,964,043 A | 10/1990 | Galvin | ............................ | 364/401 |
| 4,972,318 A | 11/1990 | Brown et al. | ................. | 364/403 |
| 4,984,155 A | 1/1991 | Geier et al. | .................... | 364/401 |
| 5,251,144 A | 10/1993 | Ramamurthi | ............ | 364/474.19 |
| 5,361,199 A | 11/1994 | Shoquist et al. | .............. | 364/401 |
| 5,478,989 A | 12/1995 | Shepley | ......................... | 235/375 |
| 5,517,405 A | 5/1996 | McAndrew et al. | ............ | 706/45 |
| 5,570,291 A | 10/1996 | Dudle et al. | ............. | 364/468.01 |
| 5,592,375 A | 1/1997 | Salomon et al. | ............... | 395/207 |
| 5,664,115 A | 9/1997 | Fraser | .............................. | 705/37 |
| 5,666,493 A | 9/1997 | Wojcik et al. | .................... | 705/26 |
| 5,710,887 A | 1/1998 | Chelliah et al. | ............... | 395/226 |
| 5,712,989 A | 1/1998 | Johnson et al. | ................ | 395/228 |
| 5,715,314 A | 2/1998 | Payne et al. | ...................... | 380/24 |
| 5,732,397 A | 3/1998 | DeTore et al. | ...................... | 705/1 |
| 5,822,743 A | 10/1998 | Gupta et al. | ..................... | 706/50 |
| 5,874,955 A | 2/1999 | Rogowitz et al. | ............. | 345/339 |
| 5,940,807 A | 8/1999 | Purcell | ............................ | 705/26 |
| 5,953,707 A | 9/1999 | Huang et al. | ..................... | 705/10 |

(Continued)

FOREIGN PATENT DOCUMENTS

WO     WO00043935     7/2000

(Continued)

OTHER PUBLICATIONS

Office Action from U.S. Appl. No. 09/708,154 mailed Apr. 22, 2004.

(Continued)

*Primary Examiner* — Lindsay M. Maguire
(74) *Attorney, Agent, or Firm* — Zilka-Kotab, PC

(57) ABSTRACT

A system, method, and computer program product embodied on a computer readable medium are provided. In use, an application is executed which is capable of performing decision logic. Further, information is retrieved from a database in accordance with the decision logic. Information is also received from a user in accordance with the decision logic utilizing a user interface. Still yet, the information is processed utilizing the decision logic. The executing, retrieving, receiving, and processing are carried out by a platform capable of accomplishing the executing, retrieving, receiving, and processing for different purposes by executing different applications each capable of performing different decision logic and using different databases. In one embodiment, the different applications are capable of being executed simultaneously. In another embodiment, the different applications (e.g. insurance, investments, etc.) are each related to asset risk management.

31 Claims, 16 Drawing Sheets

U.S. PATENT DOCUMENTS

| | | | | |
|---|---|---|---|---|
| 5,970,475 | A | 10/1999 | Barnes et al. | 705/27 |
| 5,995,951 | A | 11/1999 | Ferguson | 706/10 |
| 6,012,051 | A | 1/2000 | Sammon et al. | 706/52 |
| 6,044,362 | A | 3/2000 | Neely | 705/34 |
| 6,064,982 | A | 5/2000 | Puri | 705/27 |
| 6,119,101 | A | 9/2000 | Peckover | 705/26 |
| 6,131,087 | A | 10/2000 | Luke et al. | 705/26 |
| 6,157,915 | A | 12/2000 | Bhaskaran et al. | 705/7 |
| 6,195,651 | B1 | 2/2001 | Handel et al. | 707/2 |
| 6,195,652 | B1 | 2/2001 | Fish | 707/2 |
| 6,233,537 | B1 | 5/2001 | Gryphon et al. | 703/1 |
| 6,295,513 | B1 | 9/2001 | Thackston | 703/1 |
| 6,330,610 | B1 | 12/2001 | Docter et al. | 709/229 |
| 6,421,652 | B2 | 7/2002 | Loeb et al. | 705/14 |
| 6,443,843 | B1 | 9/2002 | Walker et al. | 463/42 |
| 6,601,034 | B1 | 7/2003 | Honarvar et al. | 705/7 |
| 6,629,135 | B1 | 9/2003 | Ross, Jr. et al. | 709/218 |
| 6,665,395 | B1 | 12/2003 | Busey et al. | 379/265.09 |
| 6,826,541 | B1 | 11/2004 | Johnston et al. | 705/10 |
| 6,826,552 | B1 | 11/2004 | Grosser et al. | 706/47 |
| 6,859,784 | B1 | 2/2005 | van Duyne et al. | 705/10 |
| 6,876,991 | B1 | 4/2005 | Owen et al. | 706/46 |
| 6,901,393 | B1 | 5/2005 | Owen et al. | 706/46 |
| 6,912,528 | B2 | 6/2005 | Homer | 707/9 |
| 6,965,868 | B1 | 11/2005 | Bednarek | 705/9 |
| 6,993,572 | B2 | 1/2006 | Ross, Jr. et al. | 709/218 |
| 7,130,807 | B1 | 10/2006 | Mikurak | 705/7 |
| 7,155,157 | B2 | 12/2006 | Kaplan | 434/350 |
| 7,194,423 | B2 | 3/2007 | Walker et al. | 705/14 |
| 7,277,865 | B1 | 10/2007 | Silverstone et al. | 705/26 |
| 7,319,970 | B1 | 1/2008 | Simone | |
| 7,346,858 | B1 | 3/2008 | Berg et al. | 715/853 |
| 7,353,180 | B1 | 4/2008 | Silverstone et al. | 705/7 |
| 7,426,474 | B2 * | 9/2008 | Schoenbaum et al. | 705/2 |
| 7,426,495 | B1 | 9/2008 | Corless | 705/75 |
| 7,546,254 | B2 | 6/2009 | Bednarek | 705/26 |
| 7,600,007 | B1 | 10/2009 | Lewis | 709/223 |
| 7,693,728 | B2 | 4/2010 | Underwood et al. | |
| 7,720,705 | B2 | 5/2010 | Stein | 705/10 |
| 7,725,570 | B1 | 5/2010 | Lewis | 709/224 |
| 7,725,571 | B1 | 5/2010 | Lewis | 709/224 |
| 7,730,172 | B1 | 6/2010 | Lewis | 709/224 |
| 7,877,412 | B2 | 1/2011 | Homer | 707/783 |
| 7,912,761 | B2 | 3/2011 | Vaid | 705/26.2 |
| 8,028,066 | B2 | 9/2011 | Lewis | 709/224 |
| 2002/0007362 | A1 | 1/2002 | Collins et al. | 707/5 |
| 2002/0042730 | A1 | 4/2002 | Homer | 705/8 |
| 2002/0049617 | A1* | 4/2002 | Lencki et al. | 705/4 |
| 2002/0076674 | A1 | 6/2002 | Kaplan | 434/107 |
| 2002/0095345 | A1 | 7/2002 | Panelli et al. | 705/26 |
| 2002/0120567 | A1 | 8/2002 | Caplan et al. | 705/40 |
| 2002/0120568 | A1 | 8/2002 | Leblang et al. | 705/40 |
| 2002/0152163 | A1 | 10/2002 | Bezos et al. | 705/40 |
| 2002/0161609 | A1* | 10/2002 | Zizzamia et al. | 705/4 |
| 2003/0054888 | A1 | 3/2003 | Walker et al. | 463/42 |
| 2003/0233278 | A1 | 12/2003 | Marshall | 705/14 |
| 2004/0006478 | A1 | 1/2004 | Alpdemir et al. | 704/275 |
| 2004/0010426 | A1* | 1/2004 | Berdou | 705/4 |
| 2004/0057569 | A1 | 3/2004 | Busey et al. | 379/265.09 |
| 2004/0081951 | A1 | 4/2004 | Vigue et al. | 434/350 |
| 2004/0095378 | A1 | 5/2004 | Vigue et al. | 345/723 |
| 2004/0148366 | A1 | 7/2004 | Ross, Jr. et al. | 709/218 |
| 2004/0167823 | A1 | 8/2004 | Neely et al. | 705/26 |
| 2004/0249719 | A1 | 12/2004 | Urpani | 705/26 |
| 2005/0187936 | A1 | 8/2005 | Homer | 707/9 |
| 2005/0251440 | A1 | 11/2005 | Bednarek | 705/10 |
| 2006/0203993 | A1 | 9/2006 | Busey et al. | 379/265.09 |
| 2007/0160970 | A1 | 7/2007 | Kaplan | 434/350 |
| 2008/0140676 | A1 | 6/2008 | Silverstone et al. | 707/10 |
| 2008/0249879 | A1 | 10/2008 | Walker et al. | 705/14 |
| 2009/0222358 | A1 | 9/2009 | Bednarek | 705/27 |
| 2010/0218104 | A1 | 8/2010 | Lewis | 715/736 |
| 2010/0241501 | A1 | 9/2010 | Marshall | 705/14.13 |
| 2011/0113067 | A1 | 5/2011 | Homer | 707/783 |
| 2011/0119308 | A1 | 5/2011 | Homer | 707/783 |
| 2011/0119769 | A1 | 5/2011 | Homer | 726/27 |
| 2011/0125552 | A1 | 5/2011 | Stein | 705/7.32 |

FOREIGN PATENT DOCUMENTS

| | | |
|---|---|---|
| WO | WO 00/54178 | 9/2000 |
| WO | WO 01/46884 | 6/2001 |

OTHER PUBLICATIONS

Office Action from U.S. Appl. No. 09/708,154 mailed Jul. 3, 2003.
Office Action from U.S. Appl. No. 09/708,244 mailed Mar. 15, 2004.
Michael J. Bender et al, "A System Approach for Collaborative Decision Support in Water Resources Planning" IEEE 1996.
Steve Glickman, "Interpreting Business Assessment Results" Jun. 8, 1998.
Wong "Preference-Based Decision Making for Cooperative Knowledge-Based Systems" Oct. 1994; Institute for New Generation Computer Technology; pp. 407-435.
Grier et al, "A Decision Support Expert System for Correction of Manufacturing Process Problems"; Dec. 1990; ACM.
Sculley et al., "B2B Exchanges: The Killer Application in the Business-to-Business Internet Revolution," ISI Publications, 2000, pp. 195-247.
"CPFR: Collaborative Planning, Forecasting, and Replenishment Voluntary Guidelines," Voluntary Interindustry Commerce Standards, 1998.
Sriram et al., "Computer-Aided Cooperative Product Development: A Case Study," International Journal of Systems Automation: Research and Applications (SARA), 1991, vol. 1, No. 1, pp. 89-112.
Miller et al., "Development of Automated Aids for Decision Analysis," Technical Report, Stanford Research Institute, May 1976.
Sriram et al., "DICE: An Object-Oriented Programming Environment for Cooperative Engineering Design," Artificial Intelligence in Engineering Design, vol. 3, Academic Press Inc., 1992, pp. 303-366.
"Strategic Management of R&D: Overview," Strategic Decisions Group, May 22, 1995.
U.S. Patent File History for U.S. Appl. No. 09/270,007, filed Mar. 16, 1999.
U.S. Patent File History for U.S. Appl. No. 09/311,150, filed May 13, 1999.
Logcher et al., "Ghost: A Project Network Generator," J. of Computing in Civil Engineering, ASCE, vol. 2, No. 3, Jul. 1988, pp. 239-254.
Guttman, "Merchant Differentiation through Integrative Negotiation in Agent-mediated Electronic Commerce," Massachusetts Institute of Technology, 1998.
Holtzman, "Intelligent Decision Systems," Addison-Wesley Publishing Company, Inc., 1989, pp. 56-106.
Kano et al., "International Multi-Company Collaborative Engineering: A Study of Japanese Engineering and Construction Firms," Massachusetts Institute of Technology, 1994.
"MIT Libraries' catalog—Barton—Full Catalog—Full Record," Massachusetts Institute of Technology, http://library.mit.edu/item/000911321, last accessed on Jan. 29, 2008.
Declaration associated with Civil Case No. 2:06-cv-440.
Subpoena associated with Civil Case No. 2:06-cv-440.
Nessralla, "*Letter re Sky Technologies LLC v. SAP AG, SAP Americas, Inc and Oracle Corporation* Subpoena for Records of the Massachusetts Institute of Technology," Jan. 30, 2008.
Sairamesh et al., "NetBazaar: Networked Electronic Markets for Trading Computation and Information Services," Springer-Verlag Berlin Heidelberg, 1998, ECDL'98, LNCS 1513, pp. 839-856.
"The Manual Decision Advisor: vol. 1—Project Analysis," Strategic Decisions Group, 1998.
Sanders, "Automated Creation of Clinical-Practice Guidelines from Decision Models," Gillian D. Sanders, Jun. 1998.
Sriram et al., "The MIT Dice Project," Computer, vol. 26, No. 1, 1993, pp. 64-65.
Sriram et al., "Transaction-Management Issues in Collaborative Engineering," J. of Computing in Civil Engineering, ASCE, vol. 6, No. 1, Jan. 1992, pp. 85-105.
"Decision Analysis Software for Microsoft Windows, Student Edition," ADA Decision Systems, 1992.
Barabba et al., "Communication in Action: GM's Dialogue Decision Process," Strategic Communication Management, Dec./Jan. 1997, pp. 24-28.

McNamee et al., "Decision Analysis with Supertree," 2nd Edition, The Scientific Press, pp. 281-304.
"Readings in Electronic Commerce," Addison Wesley Longman, Inc., 1997.
Holtzman, "Intelligent Decision Systems," Stanford University, 1985.
"NetIQ AppManager Suite," NetIQ Corporation, 2005.
Oliver et al. (ed.), "Influence Diagrams, Belief Nets and Decision Analysis," John Wiley & Sons Ltd., 1990.
Buck-Emden et al., "SAP R/3 System: A Client/Server Technology," Addison-Wesley, 1996.
"SunNetManager 2.2.3 User's Guide," Sun Microsystems, Inc., 1995.
"Supertree in Use," SDG Decision Systems, 1986.
"Quick Start: Introduction to Decision Analysis with Supertree, PC Version," SDG Decision Systems, Feb. 1989.
"LO Logisitics Information System."
"MM External Services Management."
"Consignment."
"MM Purchasing Guide."
"Sales."
"R/3 Internet Application Components."
"MM Vendor Evaluation."
Abbas, "The Evolution of Decision Analysis," Department of Management Science and Engineering, Stanford University.
Huang et al., "A Sense-and-Respond Approach to Business Transformation," Proceedings of the IEEE International Conference on E-Commerce Technology for Dynamic Business (CEC-East'04), 2004.
"Dialogue Decision Process: Alternatives."
"A Guide to CPFR Implementation," ECR Europe, Apr. 2001.
"SAP Business-to-Business Procurement."
"System Administration."
"Database Administration."
"EC Enterprise Controlling."
The IDoc Interface Concept.
"FI Financial Accounting."
"IM Investment Management."
"PM Plant Maintenance."
"General Information," EDI (Electronic Data Interchange).
"Configurable Materials in Purchasing."
"ABAP/4 Development Workbench."
"SAP Open Information Warehouse Frontend for Microsoft Excel."
Documentation associated with Civil Action No. 6:08-cv-51.
Owen, "The Concept of Influence and Its Use in Structuring Complex Decision Problems," Stanford University, Nov. 1978.
Owen et al., "Multi-agent trading environment," BT Technol J, vol. 17, No. 3, Jul. 1999, pp. 33-43.
Non-Final Office Action from U.S. Appl. No. 12/790,709, dated Aug. 19, 2010.
Non-Final Office Action from U.S. Appl. No. 12/790,709 dated May 12, 2011.

* cited by examiner

Choice Application--Structure For This Particular Type of Asset Management Instrument

Figure 6c

Alternatives Descriptions Catalogue: Health Insurance — 806

| Catalogue Number | Insurance Plan | Insurance Company | Dr. Office Deductible Waived | Dr. Office Copay | Deductible per person | Hosp-ER-0 up Copay | Maximum Out-of-Pocket per Member | Members required to meet Deductible and Maximum | Female 55 Annual Premium | Female 55 Monthly Premium |
|---|---|---|---|---|---|---|---|---|---|---|
| 1 | BC Life & Health: Basic PPO $1000 | BC Life & Health | No | 100% | 1,000 | 20% | 3,500 | 2 | 2,220 | 185 |
| 2 | BC Life & Health: Basic PPO $2500 | BC Life & Health | No | 100% | 2,500 | 20% | 5,000 | 2 | 2,088 | 174 |
| 3 | BC Life & Health: Individual RightPlan PPO | BC Life & Health | Yes | 40% | - | 40% | 7,500 | 2 | 2,724 | 227 |
| 4 | BC Life & Health: PPO Saver | BC Life & Health | Yes | 30% | 5,000 | 20% | 5,000 | 2 | 2,808 | 234 |
| 5 | BC of CA: PPO 3500 Deductible | BC of CA | No | 100% | 3,500 | 100% | 3,500 | 2 | 2,484 | 207 |
| 6 | BC of CA: PPO 2500 Deductible | BC of CA | No | 100% | 2,500 | 100% | 3,500 | 2 | 2,484 | 207 |
| 7 | BC of CA: PPO 3500 Dr. Waived | BC of CA | Yes | 100% | 3,500 | 100% | 3,500 | 2 | 2,484 | 207 |
| 8 | BC of CA: PPO Share 1000 | BC of CA | Yes | 30% | 1,000 | 30% | 5,000 | 2 | 5,400 | 450 |
| 9 | BC of CA: PPO Share 1500 | BC of CA | Yes | 30% | 1,500 | 30% | 6,000 | 2 | 4,584 | 382 |
| 10 | BC of CA: PPO Share 2500 | BC of CA | Yes | 30% | 2,500 | 30% | 7,500 | 2 | 3,312 | 276 |
| 11 | BC of CA: PPO Share 500 | BC of CA | Yes | 30% | 500 | 30% | 5,000 | 2 | 6,468 | 539 |
| 12 | BC of CA: PPO Share 5000 | BC of CA | Yes | 30% | 5,000 | 30% | 7,500 | 2 | 2,640 | 220 |
| 13 | Blue Shield: Shield Spectrum PPO Plan 15 | Blue Shield | No | 30% | 1,500 | 30% | 4,500 | 2 | 4,656 | 388 |
| 14 | Blue Shield: Shield Spectrum PPO Plan 20 | Blue Shield | No | 30% | 2,000 | 30% | 7,000 | 2 | 3,228 | 269 |
| 15 | Blue Shield: Shield Spectrum PPO Plan 50 | Blue Shield | No | 30% | 5,000 | 30% | 7,000 | 2 | 1,908 | 159 |
| 16 | Celticare: Any Doc PPO Plan 1000 100% | Celticare Any Doc | Yes | 0% | 1,000 | 100% | 1,000 | 3 | 6,288 | 524 |
| 17 | Celticare: Any Doc PPO Plan 2500 100% | Celticare Any Doc | Yes | 0% | 2,500 | 100% | 2,500 | 3 | 4,500 | 375 |
| 18 | Celticare: Any Doc PPO Plan 2500 80% | Celticare Any Doc | Yes | 0% | 2,500 | 20% | 3,500 | 3 | 3,744 | 312 |
| 19 | Celticare: Any Doc PPO Plan 500 80% | Celticare Any Doc | Yes | 0% | 500 | 20% | 1,500 | 3 | 6,396 | 533 |
| 20 | Celticare: Any Doc PPO Plan 5000 100% | Celticare Any Doc | Yes | 0% | 5,000 | 100% | 5,000 | 3 | 3,204 | 267 |
| 21 | Celticare: Any Doc PPO Plan 5000 80% | Celticare Any Doc | Yes | 0% | 5,000 | 20% | 6,000 | 3 | 2,892 | 241 |
| 22 | Celticare: Managed Indemnity 1000 80% | Celticare Managed | No | 20% | 1,000 | 20% | 2,000 | 3 | 6,948 | 579 |
| 23 | Celticare: Managed Indemnity 2500 100% | Celticare Managed | No | 100% | 2,500 | 100% | 2,500 | 3 | 5,724 | 477 |
| 24 | Celticare: Managed Indemnity 2500 80% | Celticare Managed | No | 20% | 2,500 | 20% | 3,500 | 3 | 4,764 | 397 |

Figure 6d

User's Family Description

Name
Jill

Add / Delete Dependents

View / Edit Your Profiles

Age  Sex
55    F

What is the most you could afford
to pay including the premium?

$7,000

Add / Edit Pre-tax Savings

Side-by-side Comparison of Risk and Cost for
Each Policy of Interest

┌─ 812

| | Alternative Plans | Annual Premium, $ | Expected Total Cost Including the Premium | Risk of Paying the Most You Could Afford |
|---|---|---|---|---|
| | Results | | | |
| Health Insurance | PPO 5000 | $2,928 | $4,722 | 9% |
| Health Insurance | PPO 1000 | $5,712 | $7,116 | 34% |
| | No Insurance | $0 | $3,248 | 16% |

Choice Application--Structure For This Particular Type of Asset Management Instrument

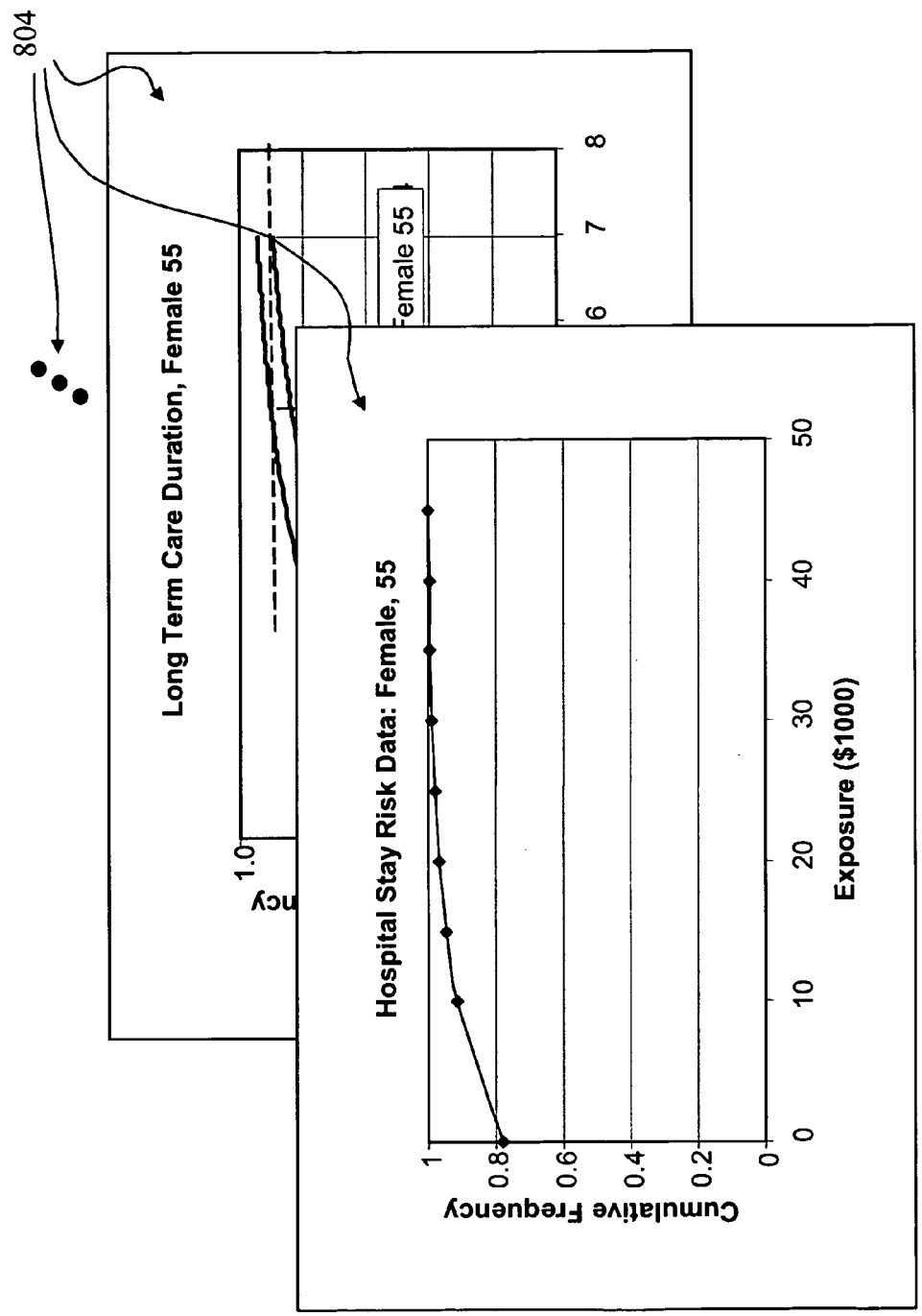
Figure 7b  Database Of Individual Risk As A Function Of Individual Characteristics

Figure 7c

Alternatives Descriptions Catalogue: Long-term Care Insurance

| Catalogue Number | Long-term Care Plans | Total Benefit Amount | Monthly Benefit Amount | Benefit Duration (years) | Monthly premium | Elimination Period (months) | In home coverage |
|---|---|---|---|---|---|---|---|
| 1 | AARP "FlexChoice" Basic | $87,600 | $1,800 | 4 | $262.44 | 1 | No |
| 2 | AARP "FlexChoice" Choice | $175,200 | $3,600 | 4 | $640.92 | 1 | Yes |

Alternatives Descriptions Catalogue: Health Insurance

| Catalogue Number | Insurance Plan | Insurance Company | Dr. Office Deductible Waived | Dr. Office Copay | Deductible per person | Monthly Benefit Amount | Hosp+ER+O utp Copay | Maximum Out of Pocket per Member | Members required to meet Deductible and Maximum | Female 55 Annual Premium | Female 55 Monthly Premium |
|---|---|---|---|---|---|---|---|---|---|---|---|
| 1 | BC Life & Health: Basic PPO $1000 | BC Life & Health | No | 100% | 1,000 | | 20% | 3,500 | 2 | 2,220 | 185 |
| 2 | BC Life & Health: Basic PPO $2500 | BC Life & Health | No | 100% | 2,500 | | 20% | 5,000 | 2 | 2,088 | 174 |
| 3 | BC Life & Health: IndividualRightPlan PPO | BC Life & Health | Yes | 40% | - | | 40% | 7,500 | 2 | 2,724 | 227 |
| 4 | BC Life & Health: PPO Saver | BC Life & Health | Yes | 30% | 5,000 | | 20% | 5,000 | 2 | 2,808 | 234 |
| 5 | BC of CA: PPO 3500 Deductible | BC of CA | No | 100% | 3,500 | | 100% | 3,500 | 2 | 2,484 | 207 |
| 6 | BC of CA: PPO 2500 Deductible | BC of CA | No | 100% | 2,500 | | 100% | 3,500 | 2 | 2,484 | 207 |
| 7 | BC of CA: PPO 3500 Dr. Waived | BC of CA | Yes | 100% | 3,500 | | 100% | 3,500 | 2 | 2,484 | 207 |
| 8 | BC of CA: PPO Share 1000 | BC of CA | Yes | 30% | 1,000 | | 30% | 5,000 | 2 | 5,400 | 450 |
| 9 | BC of CA: PPO Share 1500 | BC of CA | Yes | 30% | 1,500 | | 30% | 6,000 | 2 | 4,584 | 382 |
| 10 | BC of CA: PPO Share 2500 | BC of CA | Yes | 30% | 2,500 | | 30% | 7,500 | 2 | 3,312 | 276 |
| 11 | BC of CA: PPO Share 500 | BC of CA | Yes | 30% | 500 | | 30% | 5,000 | 2 | 6,468 | 539 |
| 12 | BC of CA: PPO Share 5000 | BC of CA | Yes | 30% | 5,000 | | 30% | 7,500 | 2 | 2,640 | 220 |
| 13 | Blue Shield: Shield Spectrum PPO Plan 15 | Blue Shield | No | 30% | 1,500 | | 30% | 4,500 | 2 | 4,656 | 388 |
| 14 | Blue Shield: Shield Spectrum PPO Plan 20 | Blue Shield | No | 30% | 2,000 | | 30% | 7,000 | 2 | 3,228 | 269 |
| 15 | Blue Shield: Shield Spectrum PPO Plan 50 | Blue Shield | No | 30% | 5,000 | | 30% | 7,000 | 2 | 1,908 | 159 |
| 16 | Cellicare: Any Doc PPO Plan 1000 100% | Cellicare Any Doc | Yes | 0% | 1,000 | | 100% | 1,000 | 3 | 6,288 | 524 |
| 17 | Cellicare: Any Doc PPO Plan 2500 100% | Cellicare Any Doc | Yes | 0% | 2,500 | | 100% | 2,500 | 3 | 4,500 | 375 |
| 18 | Cellicare: Any Doc PPO Plan 2500 80% | Cellicare Any Doc | Yes | 0% | 2,500 | | 20% | 3,500 | 3 | 3,744 | 312 |
| 19 | Cellicare: Any Doc PPO Plan 500 80% | Cellicare Any Doc | Yes | 0% | 500 | | 20% | 1,500 | 3 | 6,396 | 533 |
| 20 | Cellicare: Any Doc PPO Plan 5000 100% | Cellicare Any Doc | Yes | 0% | 5,000 | | 100% | 5,000 | 3 | 3,204 | 267 |
| 21 | Cellicare: Any Doc PPO Plan 5000 80% | Cellicare Any Doc | Yes | 0% | 5,000 | | 20% | 6,000 | 3 | 2,892 | 241 |
| 22 | Cellicare: Managed Indemnity 1000 80% | Cellicare Managed | No | 20% | 1,000 | | 20% | 2,000 | 3 | 6,948 | 579 |
| 23 | Cellicare: Managed Indemnity 2500 100% | Cellicare Managed | No | 100% | 2,500 | | 100% | 2,500 | 3 | 5,724 | 477 |
| 24 | Cellicare: Managed Indemnity 2500 80% | Cellicare Managed | No | 20% | 2,500 | | 20% | 3,500 | 3 | 4,764 | 397 |

User's Family Description

Name
Jill

Age  Sex
55   F

Add / Delete Dependents

View / Edit Your Profiles

What is the most you could afford
to pay including the premium?

$7,000

Add / Edit Pre-tax Savings

Side-by-side Comparison Of The Risk And Cost From Several Asset Management Instruments Given The Families Current Protection

— 812

Results

| Asset Management Instruments | Current Coverage | Annual Premium, $ | Expected Total Cost Including the Premium | Risk of Paying the Most You Could Afford |
|---|---|---|---|---|
| Health Insurance | PPO 5000 | $2,928 | $4,722 | 9% |
| Long-term Care Insurance | Flex Basic | $624 | $17,826 | 21% |
| ••• | ••• | ••• | ••• | ••• |
| Total for the Family | | $3,552 | $22,548 | 18% |

US 8,095,392 B1

SYSTEM, METHOD AND COMPUTER PROGRAM PRODUCT FOR FACILITATING INFORMED DECISIONS RELATING TO FAMILY RISK

RELATED APPLICATION(S)

The present application claims the priority of a previously filed provisional application filed Jan. 20, 2005 under Ser. No. 60/646,186, which is incorporated herein by reference in its entirety.

BACKGROUND AND FIELD OF THE INVENTION

The present invention relates to decision making logic, and more particularly to a computer-based platform which supports a decision making process.

SUMMARY

A system, method, and computer program product embodied on a computer readable medium are provided. In use, an application is executed which is capable of performing decision logic. Further, information is retrieved from a database in accordance with the decision logic. Information is also received from a user in accordance with the decision logic utilizing a user interface. Still yet, the information is processed utilizing the decision logic. The executing, retrieving, receiving, and processing are carried out by a platform capable of accomplishing the executing, retrieving, receiving, and processing for different purposes by executing different applications each capable of performing different decision logic and using different databases. In one embodiment, the different applications and different databases are capable of being executed simultaneously. In another embodiment, the different applications (e.g. insurance, investments, etc.) are each related to asset risk management.

BRIEF DESCRIPTION OF THE DRAWINGS

FIGS. 6a-e illustrate an example of an application of the various logic components set forth in FIGS. 3-5, in accordance with still yet another embodiment.

FIGS. 7a-e illustrate an example of an application of the various logic components set forth in FIGS. 3-5 for the simultaneous execution of multiple applications, in accordance with still yet another embodiment.

DETAILED DESCRIPTION

Figure 1A:
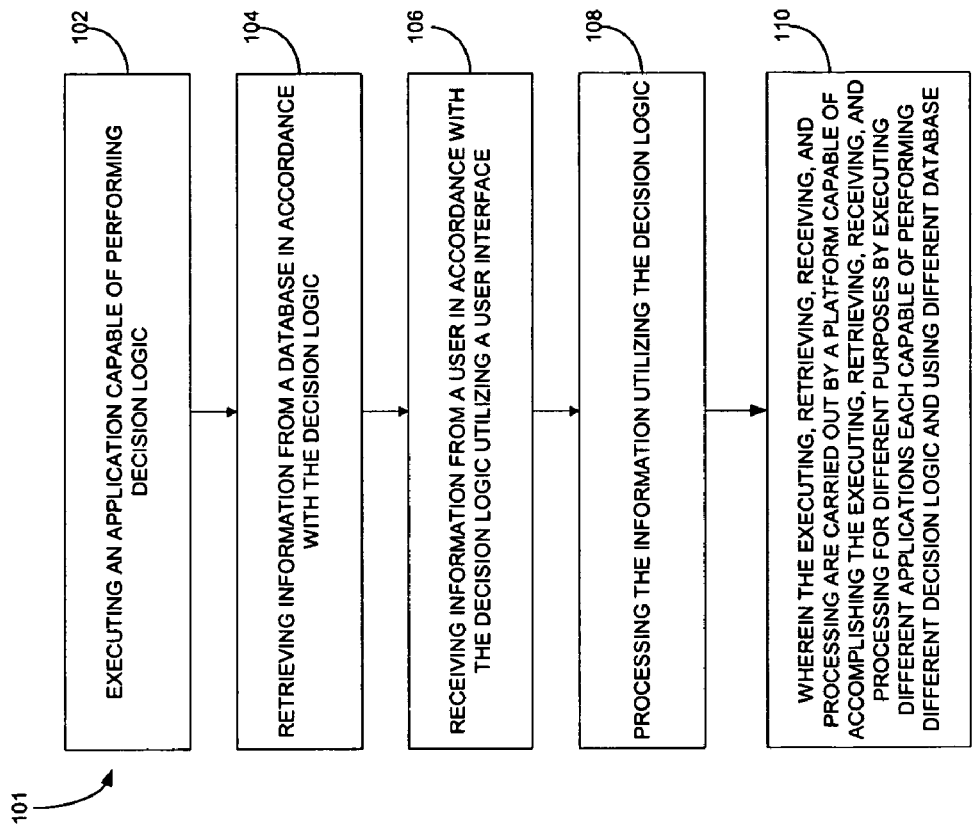
FIG. 1a illustrates a method for providing a platform adapted to run on a computing platform, in accordance with one embodiment.

FIG. 1a illustrates a method 101 for providing a choice platform adapted to run on a computing platform, in accordance with one embodiment. Initially, one or more applications capable of performing decision logic are executed. See operation 102. Such application may refer to any software program capable of performing logic capable of being used to facilitate decision making.

Information is then retrieved from a database in accordance with the decision logic, as indicated in operation 104. Information is then delivered to and received from a user in accordance with the decision logic utilizing a user interface. Note operation 106. It should be noted that, in the context of the present description, the information from operations 104 and 106 may be the same information or different, as desired.

The information is then processed in operation 108 utilizing the decision logic. In use, the foregoing operations are carried out by a platform capable of accomplishing the same for different purposes by executing different applications each capable of performing different decision logic and using different database. Note operation 110.

In one optional embodiment, the different applications are capable of being executed simultaneously. Optionally, such simultaneous operation may allow information associated with such different applications to be input and/or processed so that one or more users may make a coherent set of choices regarding different aspects of any particular area of interest including, but not limited to asset risk management, etc. It should be noted that such asset risk management is defined to include management of any assets, cash flow, and/or budgets, etc., which are affected by risk mitigation instruments (e.g. health insurance, automobile insurance, life insurance, financial investments, long term care insurance, home security devices, vehicle security devices, insurance, investments, etc.). To this end, the different applications may each be related to a particular different aspect of an area of interest.

In the context of an asset risk management system, the foregoing simultaneous execution may be used to identify optimal results (e.g. protection, etc.) given a predetermined cost, and/or identify a minimal cost while maintaining a given predetermined amount of results. In another embodiment, this may be accomplished using comparisons to facilitate decision making. For example, a comparison of total annual expected consequences (and/or the likelihood thereof) may be provided. Further, the information may optionally be processed utilizing the decision logic for determining whether a predetermined amount of resources will be exceeded, and/or for determining a likelihood thereof. More information regarding such optional comparison functionality will be set forth hereinafter in greater detail.

In the context of the present description, the aforementioned platform may include any combination of hardware and/or software. In one optional embodiment, the platform may include an individual or family choice platform that is tailored for a particular individual or family, respectively. More information regarding a particular family choice platform embodiment will be set forth hereinafter in greater detail.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
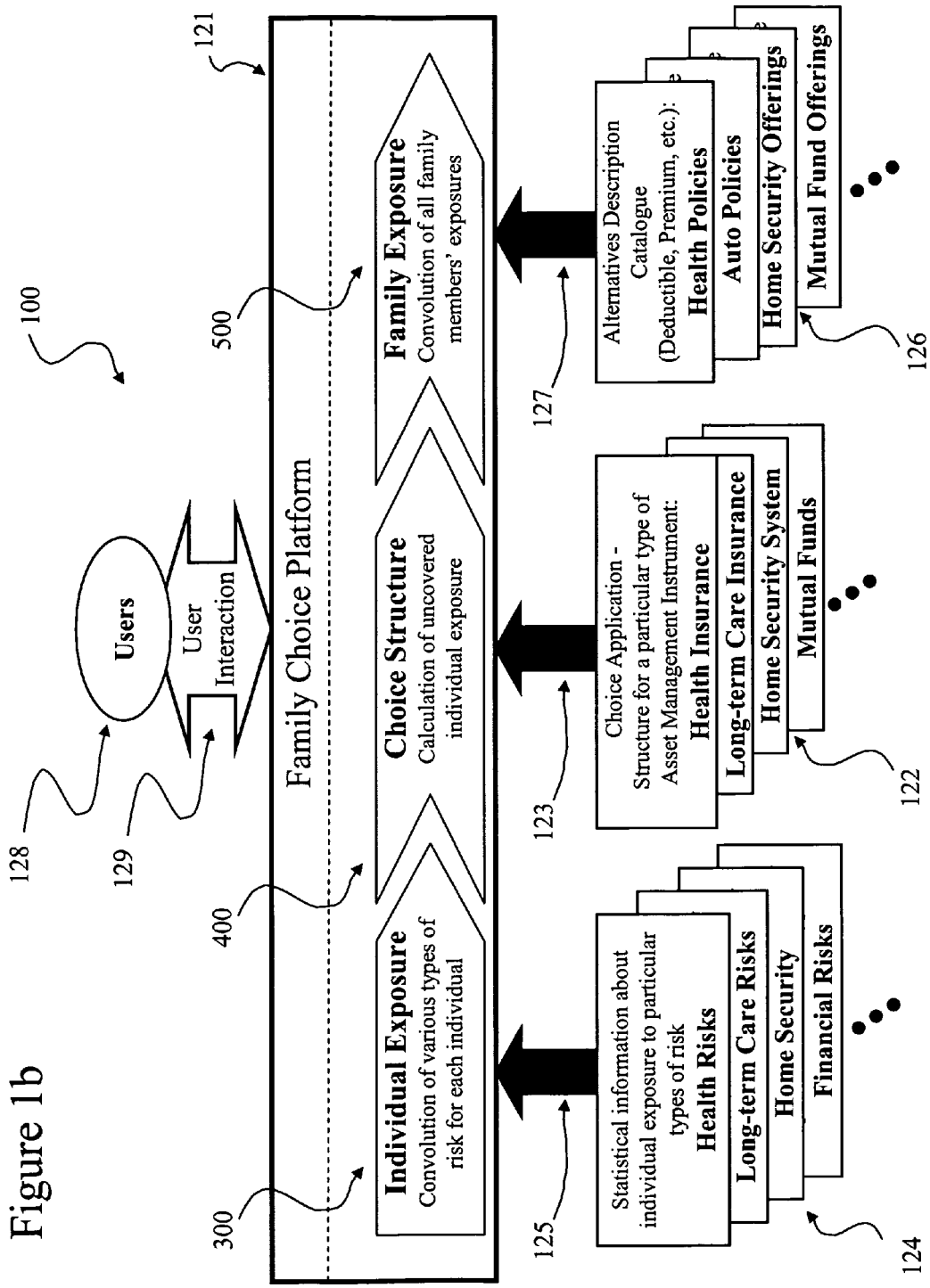
FIG. 1b illustrates a system by which the foregoing method of FIG. 1a may be carried out, in accordance with one optional embodiment.

FIG. 1b illustrates a system 100 by which the foregoing method of FIG. 1a may be carried out. Of course, however, the system 100 may be carried out in any desired environment.

As shown, a family choice platform 121 is provided which has an interface 123 with at least one application 122 for executing the decision logic, as set forth in operation 102 of FIG. 1*a*. Further included is a statistical database 124, which has an interface 125 with the family choice platform 121, and an alternatives description catalogue 126, with its interface 127, in accordance with operation 104 of FIG. 1*a*. Further, a user interface 129 is provided for receiving information from and providing information to the users 128.

The interfaces 123, 125, 127, and 129 are defined by the family choice platform 121. The users may play a part of the system 100. Note the two-headed arrow representing the users' interface 129 with the family choice platform 121 to indicate such interaction, while the single arrowhead of the interface 123, 125 and 127 indicates input. Note operation 106 of FIG. 1*a*. The family choice platform 121 may be run on any type of hardware architecture.

The platform may include various process operations in enabling the user to make informed choices: an individual exposure process operation, a choice structure process operation and a family exposure process operation. The purpose of the individual exposure process operation 300 is to develop frequency distributions of the total exposure for various types of risk that are pertinent to a particular type of asset risk management instruments of interest to the user. The purpose of the choice structure process operation 400 is to provide a reasonable assessment of the probability distribution representing the total cost exposure for each of the user's family members for each of the alternatives of interest for a particular type or types of asset risk management instrument(s). The purpose of the family exposure process operation 500 is to provide the user with the side-by-side comparison of the family's risk and expected total benefit or cost for each of the alternatives of interest. In another embodiment, one or more alternatives may be provided to and/or by the user. Each of these operations may be tailored to the family choice or choices at hand through the choice application.

The various operations of FIG. 1*a* may, in one embodiment, be carried out using universal modules capable of interfacing with different choice applications. Such different applications 122 may be capable of performing decision logic relating to the decision-making process for family choices about various types of asset risk management instruments (e.g. health insurance, car insurance, long-term care insurance, refinancing, mortgages, loans, investments, home security devices, automobile security devices, etc.). In use, the family choice platform 121 enables decision-making processes through the sequence and connectivity of a set of common displays, which describes the choice or choices to be made.

In another embodiment, several applications for different types of asset risk management instruments and their corresponding databases may be hosted simultaneously by the family choice platform. In this way, the family may make a coherent set of choices regarding, for example, different types of insurance, different types of investments or both in order to reduce the total risk to the family or to reduce the total cost of a particular level of protection.

Further, the database 124 and catalogue 126 may take the form of any one or a plurality of databases which may or may not be interconnected via a network such as the Internet. To this end, the present embodiment may be designed to foster informed and conscientious choice.

Figure 2:
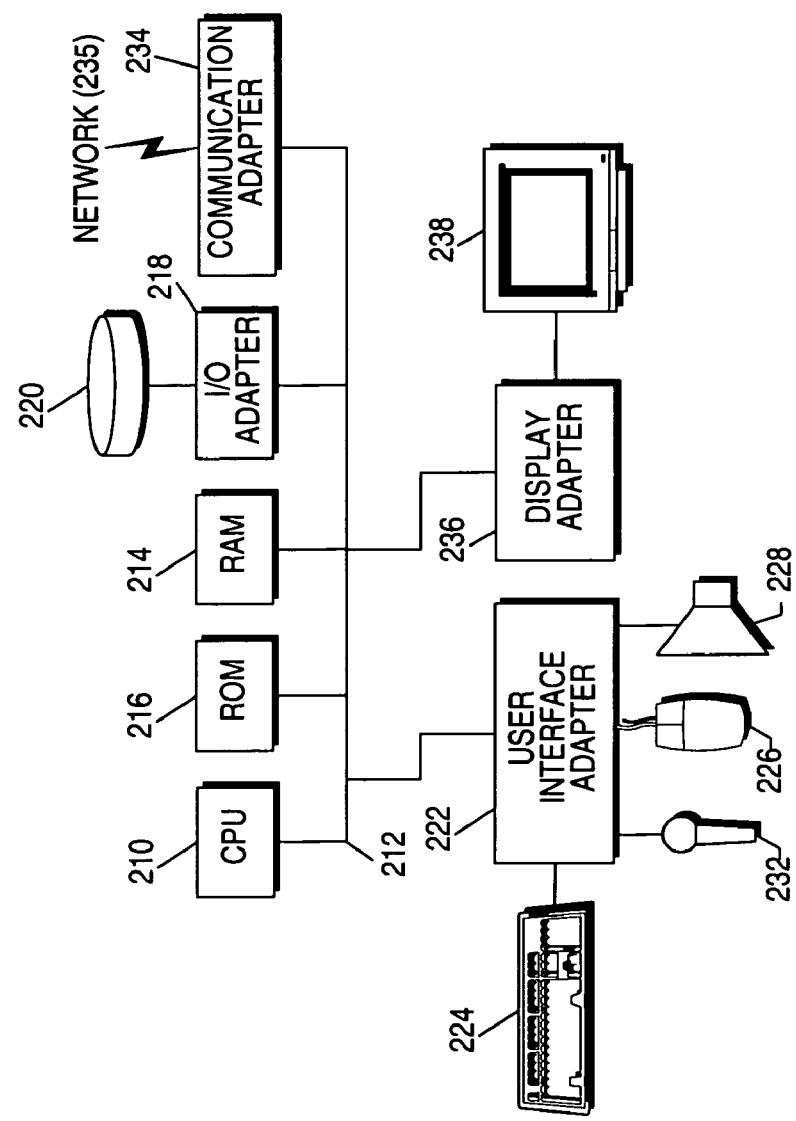
FIG. 2 shows a representative hardware environment on which the family choice platform of FIG. 1b may be implemented, in another possible embodiment.

FIG. 2 shows a representative hardware environment on which the family choice platform 121 of FIG. 1*b* may be implemented, in another embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present embodiment may also be implemented on platforms and operating systems other than those mentioned.

One embodiment written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the operations of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which is accessed at run-time through a component integration architecture. A component integration architecture is a set of architecture mechanisms which allow software modules in different process spaces to utilize each other's capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C-FF language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it may control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. One embodiment utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation.

It should be noted that, in one embodiment, the information database and the common displays may all be treated as objects by the platform. As such, the foregoing technology may be utilized in the implementation of the overall system, as embodied in FIG. 1a.

Various Embodiments

In one optional embodiment, the platform may act as a "choice engine" which drives the decision process through a sequence of logical operations to provide decision-relevant information. The users' interface during these operations is the set of common displays exhibited by the platform. The users receive and provide specific decision-relevant information to the platform by entering or modifying the information in the display areas where appropriate. In order to start the process, the platform hosts one or more choice applications selected by the user that provides the structure for the type of asset risk management instruments that are of interest to the user. The application and platform communicate through a standard interface protocol. The platform guides the user through various process operations (e.g. individual exposure, choice structure, family exposure, etc.), but these are tailored to the choice type selected by the user through the choice application.

Figure 3:
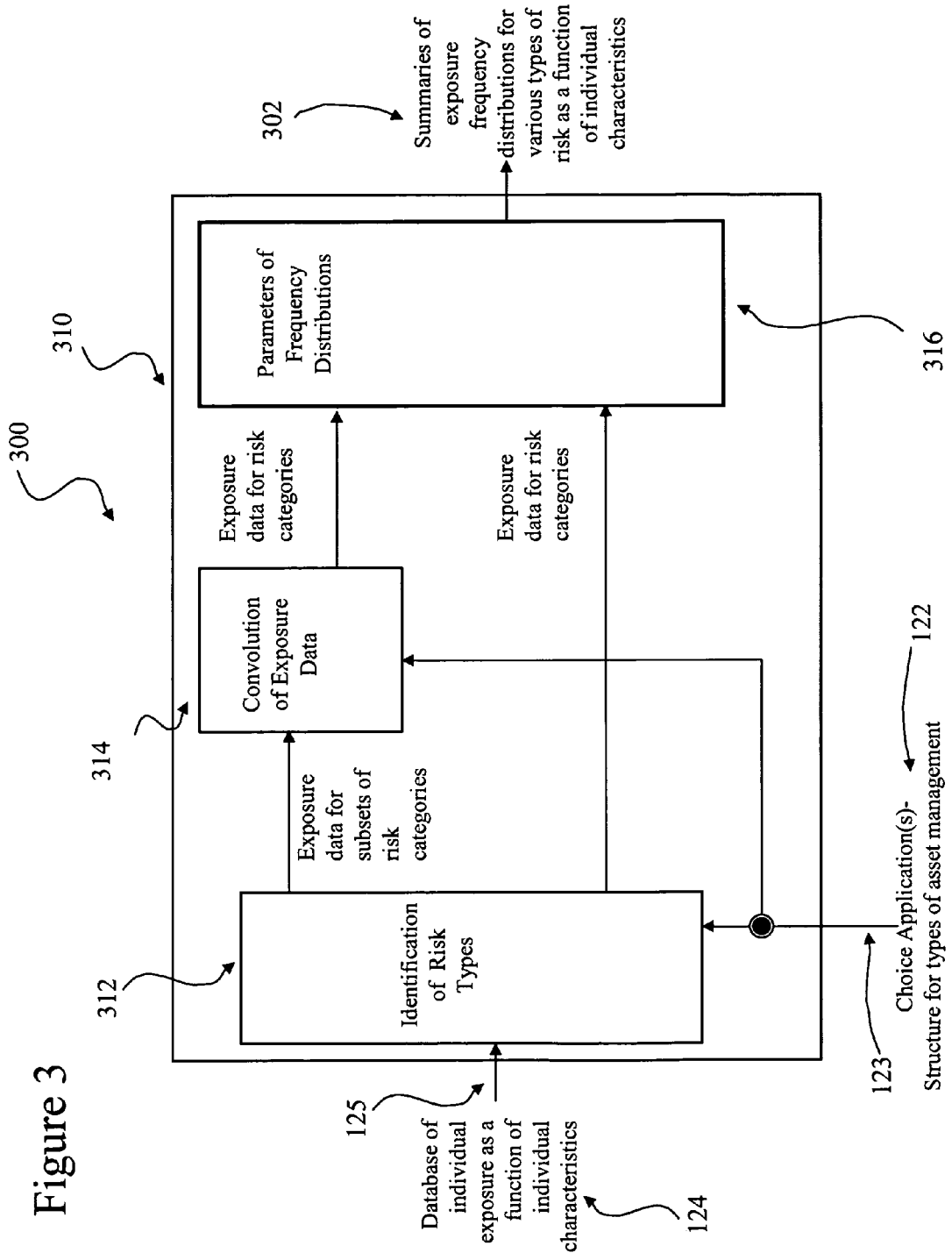
FIG. 3 illustrates various logic associated with individual exposure, in accordance with one embodiment.

FIG. 3 illustrates various logic 310 associated with the individual exposure 300, in accordance with one embodiment. As an option, the logic 310 may be implemented in the context of the architecture and environment of the previous figures. Of course, however, the logic 310 may be carried out in any desired environment.

The purpose of the individual exposure process operation 300 is to develop frequency distributions of the total cost exposure for various types of risk that are pertinent to the application or applications selected by the user. These frequency distributions may generally be a function of a variety of individual characteristics 302, such as age, general health, wealth portfolio, etc. The choice type may be specified by the user through the selection of a particular type or types of choice application(s) 122.

As a part of the individual exposure model, each particular choice application provides a description and equations for the structure of the type(s) of asset risk management instruments selected as input in a specific format or protocol 123 specified by the family choice platform. Such input may include identification of the pertinent risks to which the family is exposed. For example, for the health insurance choice application, pertinent risks could be hospital visits, doctor office visits, emergency room treatments, prescription drugs, etc.

Using this key input from the choice application(s) 122 in the specific format associated with the relevant interface 123, a first module 312 of the individual exposure process operation for identification of risk types prompts a database of risk exposure data 124 for risks that are pertinent to the family choice for the type asset risk management instrument(s) of interest to the user as indicated by the choice application(s) 122. "Risk exposure data" may, in one embodiment, refer to a statistical compilation of the historical frequency distribution on the benefits and costs associated with a particular type of risk. This data may be available as a function of several individual characteristics, such as age, general health, driving record, financial portfolio, zip code etc.

The risk exposure data 124 for some of the risks may be useable as-is, but the data for other risks may have to be combined in order to provide the risk exposure data for risk types required by a particular choice application selected by the user. For example, risk exposure data is available for emergency room visits, hospital stays and outpatient treatments, but health insurance policies cover "major medical" risks, which is the combination of all three of these risks.

As another example, the performance of some investment types may be influenced by business risks, exchange rate risks and inflationary risks. Therefore, the convolution of exposure data module 314 convolves the exposure data for any risk types that are combined in the choice application. "Convolution," in one embodiment, refers to the mathematical combination of frequency distributions of different types of risk into a frequency distribution describing the combined risk.

Once exposure data for all covered risks have been obtained from the identification of risk types module 312 and the convolution of exposure data module 314, a parameters of the frequency distributions module 316 provides a model of the exposure for each covered risk as a function of individual characteristics that are relevant to choice type specific by the user. Hence, the results are summaries of the exposure frequency distributions for various risks as a function of individual characteristics for the choice application(s) selected by the user.

One embodiment of the parameters of the frequency distributions module is to approximate the moments of the frequency distribution for each risk type as a function of the individual characteristics. For example, if the central moments of the frequency distribution are denoted by $\langle V \rangle$, $\langle V^2 - \langle V \rangle^2 \rangle$, $\langle V^3 - \langle V \rangle^3 \rangle$, etc., and each of these moments is a function an individual characteristic, x, the dependency of the frequency distribution on x can be modeled as that set forth in Equations #1 and 2 below:

Equations #1 & 2

$$\langle V \rangle(x) = \langle V \rangle(x_0) + \frac{\delta}{\langle V \rangle}(x - x_0) + \frac{1}{2}\frac{\delta^2}{\langle V \rangle}(x - x_0)^2, \quad (1)$$

$$\langle V^2 - \langle V \rangle^2 \rangle(x) = \\ \langle V^2 - \langle V \rangle^2 \rangle(x_0) + \frac{\delta\langle V^2 - \rangle}{\langle V \rangle^2}(x - x_0) + \frac{1}{2}\frac{\delta^2\langle V^2 - \rangle}{\langle V \rangle^2}(x - x_0)^2, \quad (2)$$

(etc.)

An arbitrary level of accuracy in representing the available frequency distributions can be obtained by increasing the order of the above equations. If x is the age of the insured, the equations above may be a reasonable representation of the frequency distribution on exposure as a function of age.

Figure 4:
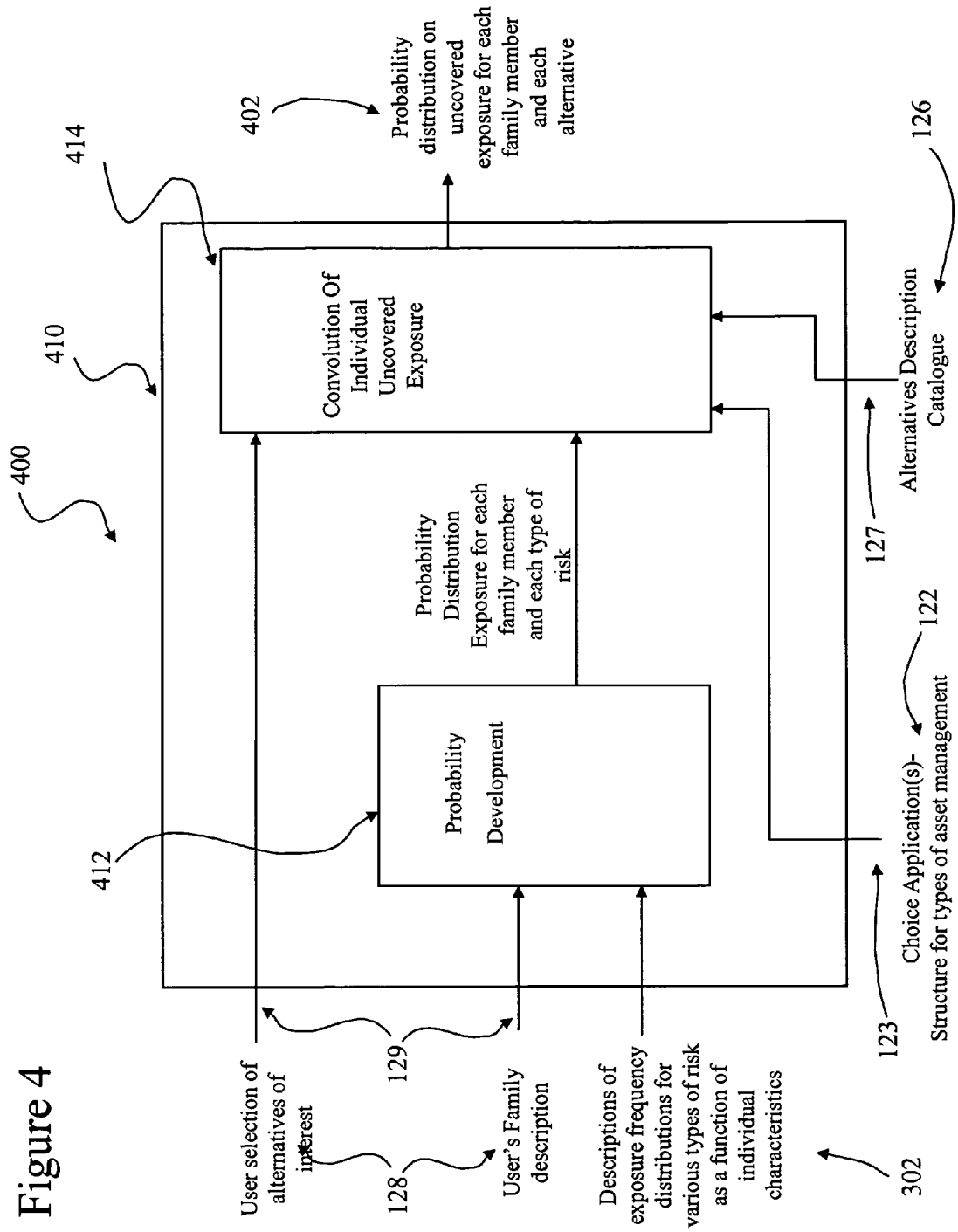
FIG. 4 illustrates various logic associated with a choice structure process operation, in accordance with another embodiment.

FIG. 4 illustrates various logic 410 associated with the choice structure process operation 400, in accordance with another embodiment. As an option, the logic 410 may be implemented in the context of the architecture and environment of the previous figures. Of course, however, the logic 410 may be carried out in any desired environment.

The purpose of choice structure is to provide a reasonable assessment of the probability distribution representing the total exposure for each family member for each alternative of interest 402 for the type of asset risk management instruments that has been selected by the user. After the individual exposure operation, the platform moves to the choice structure operation, and receives input about the structure of the type of asset risk management instrument from the choice application 122.

As an example, for insurance such input may include the existence and nature of deductibles, the types of risks that are covered, the existence and nature of a maximum coverage or insurance cap, whether coverage is by occurrence or amount (e.g. coverage per doctor's office visit, an annual coverage for all doctors' offices visits, etc.) or both, the existence and nature of insured's copays, individual and family characteristics that affect the premium, and/or the relationship of the above elements. Choice structure also receives data about specific alternatives from the alternative description catalogue database 126. The user selects the particular alternatives of interest from the database and provides information describing his/her family 128.

Included with the logic of choice structure 410 is a first probability development module 412 that receives the summaries of total exposure frequency distributions for various risks as a function of individual characteristics for risks that are pertinent for the type of asset risk management instrument(s) selected by the user 302, which was generated by the logic of the individual exposure model 310. This probability development module 412 obtains information about the user's family from the user 128. This information enables the module to generate a reasonable assessment of the probability distribution describing the prospective risk exposure for each family member, using, for example, Equations #1 & 2, etc. Here, the "probability" distribution, which describes the prospective risk, may be distinguished from the "frequency" distribution, which gives statistical information about the past. It is the probability distribution that may be helpful to informed decision making.

A second choice structure module, the convolution of individual uncovered exposure module, 414 includes logic to "subtract" any protection from risk provided by each choice application 122 from the probability distribution on exposure for each family member for each risk, which is the output of the first probability development module 412. Because the exposure is described by a probability distribution, this "subtraction" may be performed by convolving the protection provided by a particular alternative of interest in the type(s) of asset risk management instruments selected by the user.

Convolution may be accomplished through several methods, such as analytical convolution and probabilistic simulation. The particular alternatives of interest are selected by the user 128 from the catalogue of alternative descriptions 126. The result of this convolution module is a probability distribution on uncovered exposure for each family member for each alternative of interest 402. The resulting "uncovered exposure" is the exposure not covered by any risk protection, such as insurance, stop-losses, interest rate limitations, home security devices, vehicle security devices, etc., that might be included in a particular alternative of interest for the selected asset risk management instrument(s).

Figure 5:
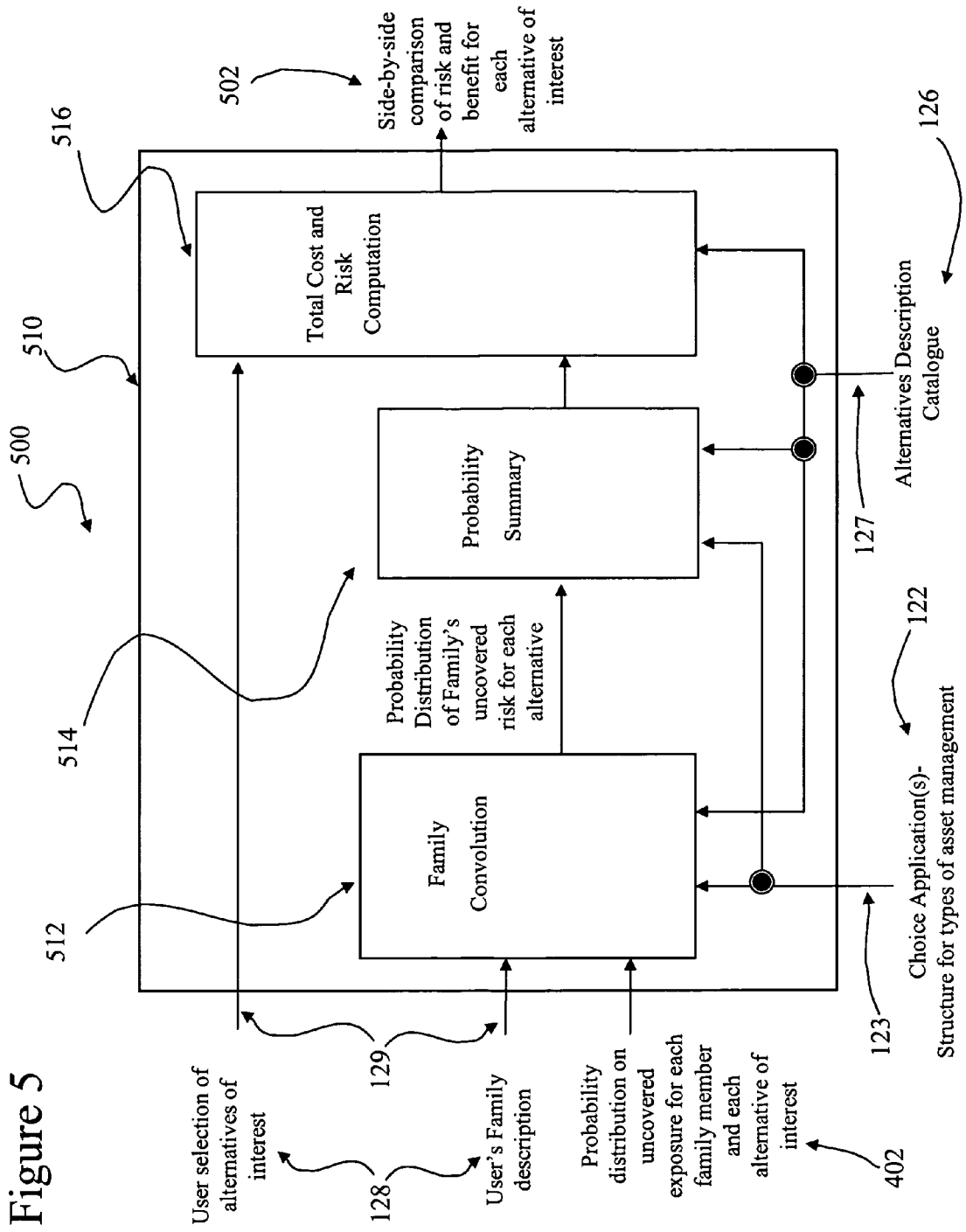
FIG. 5 illustrates various logic associated with family exposure, in accordance with yet another embodiment.

FIG. 5 illustrates various logic 510 associated with a family exposure operation 500, in accordance with yet another embodiment. As an option, the logic 510 may be implemented in the context of the architecture and environment of the previous figures. Of course, however, the logic 510 may be carried out in any desired environment.

The purpose of the family exposure process operation is to provide the user with a side-by-side comparison of the family's risk and total benefits or costs for each alternative of interest to the user 502. Subsequent to the choice structure process operation, the platform moves to the family exposure process operation 500 and receives information about the choice structure selected by the user from the choice application(s) 122. Family exposure 500 also receives data about specific alternatives from the alternatives description catalogue database 126. The user selects the particular alternatives of interest from the catalogue and provides information describing his/her family 128.

The logic 510 of the family exposure model 500 includes a first family convolution module 512 that combines the probability distributions of uncovered exposure for each family member for each alternative of interest 402 into a probability distribution on uncovered exposure for the family, as a whole. As before, the appropriate way to combine probability distributions is to convolve them. The family convolution module also takes as input the choice application(s) 122, the catalogue of policy descriptions 126 and the user's family description and selection of alternatives of interest 128.

The output of the first family convolution module 512 is further used by a second module 514 of the family exposure operation. The second probability summary module 514 takes as input the probability distribution on uncovered exposure for the family, as a whole, for each alternative of interest from the first module 512 and input from the choice application 122. It provides summary information about the risk and cost pertinent to the informed choice by the user. For example, summary information for a health insurance policy could be the annual expected cost that is not covered by the insurance policy and the likelihood or probability that the annual out-of-pocked cost is more than the family can afford. For long-term care insurance, the summary information could be the expected life-time cost of the policy and the likelihood or probability that long-term care consumes a specified portion of the family's assets. The summary information may be different for types of asset risk management instruments.

In parallel with the first and second family exposure modules is a third total risk and cost computation module 516 that takes as input summary information about the risk and total cost pertinent to the informed choice among alternatives, which is the output of the second analysis module 514, the choice application 122, the alternative description catalogue 126 and the user's of alternatives of interest 128. With such input, the third total risk and cost computation module 516 provides the side-by-side comparison of risk and total cost for each of the alternatives of interest.

For example, the side-by-side comparison of health insurance policies could be the annual total expected cost, which is the expected uncovered cost plus the premium and the likelihood or probability that the annual out-of-pocked cost is more than the family can afford. Given this information, the user may make an informed and conscientious choice. The information provided in the side-by-side comparison may be different for types of asset risk management instruments, but the family choice platform assures a common format.

FIGS. 6a-e illustrate an example of an application of the various logic components set forth in FIGS. 3-5, in accordance with still yet another embodiment. As shown, such illustrative application of the family choice platform relates to an individual and his/her spouse, the users, selecting a family health insurance policy to reduce risk to the family.

Figure 6A:
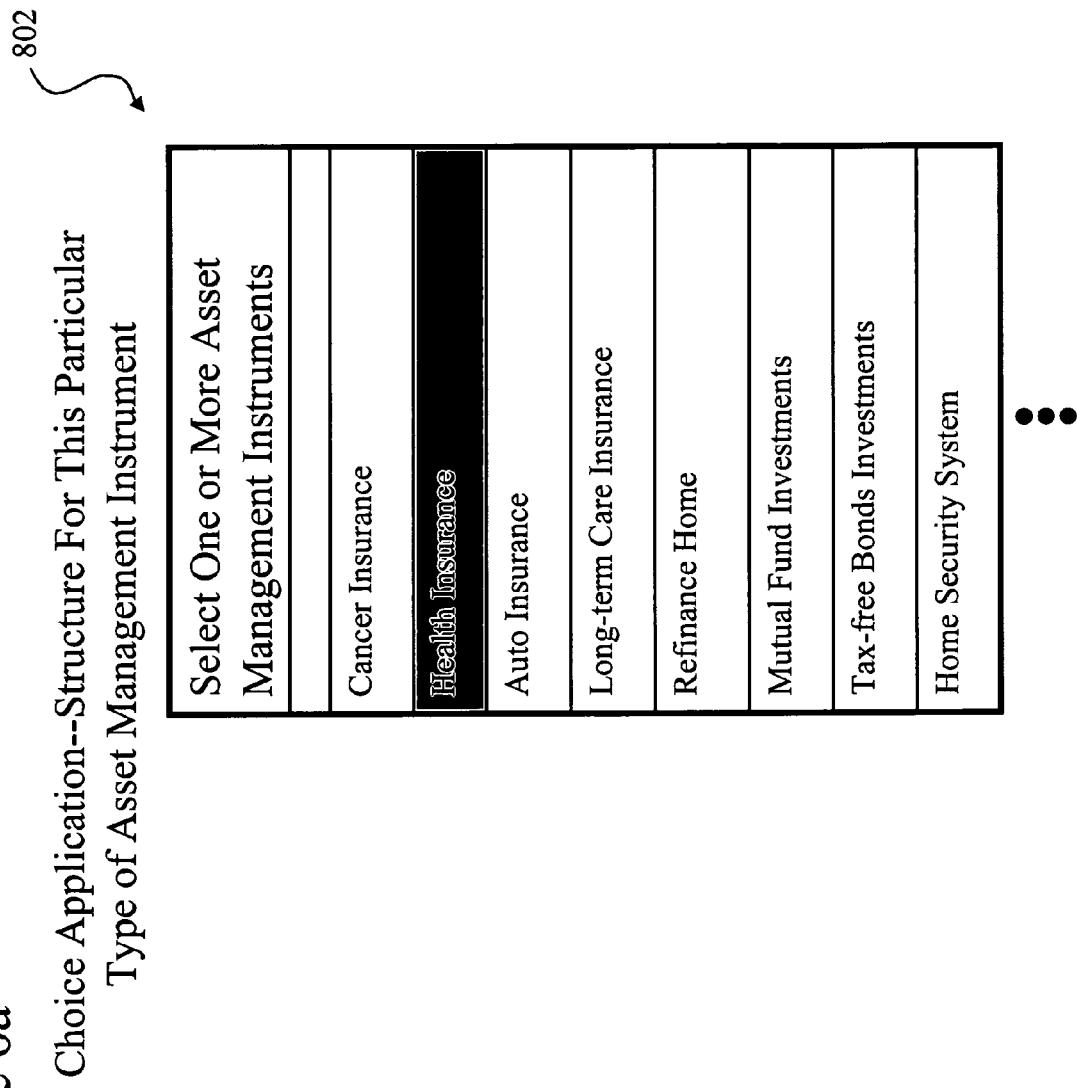
Figure 6B:
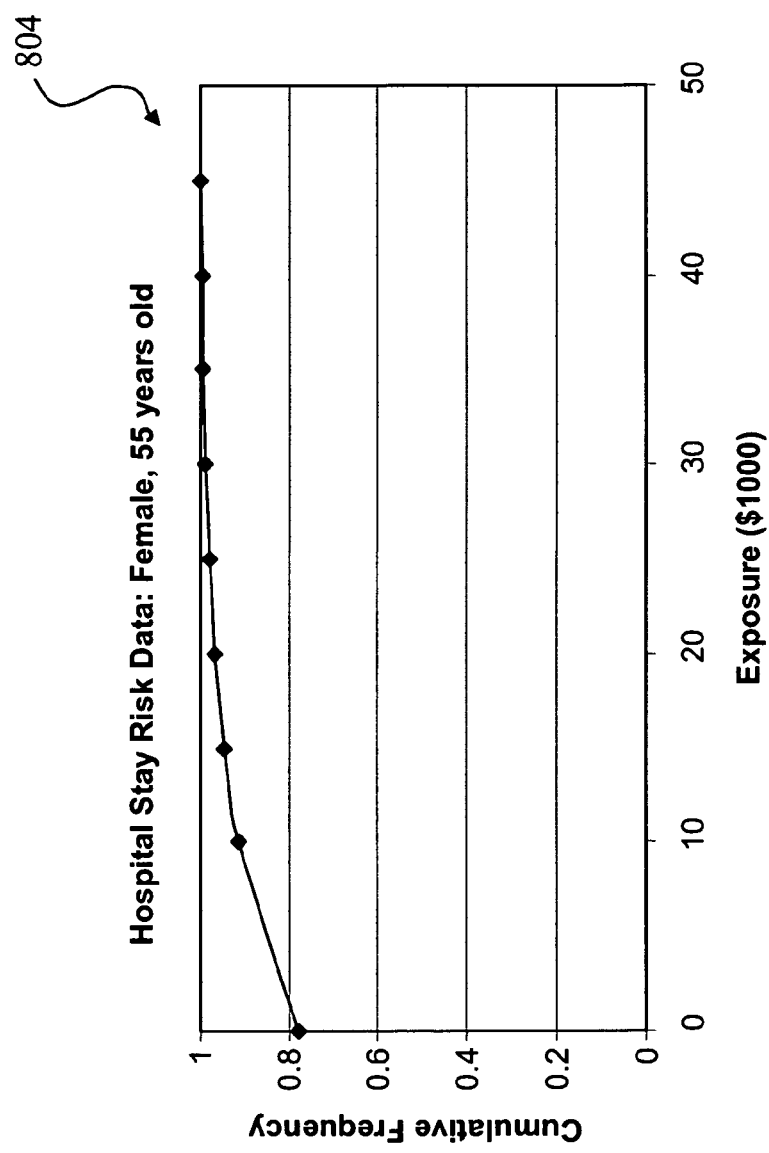

In the individual exposure process operation, the family choice platform uses input from the choice application 802 shown in FIG. 6a, which is selected by the user to select the type of asset risk management instrument(s). That selection provides the platform with information about what risks are covered in order that the appropriate frequency distributions on exposure 804, which is shown in FIG. 6b, may be selected from a database by the platform and combined where necessary. The individual exposure process operation produces descriptions of frequency distributions for various types of covered risks as a function of individual characteristics, such as sex, age, etc.

In the choice structure process operation, the family choice platform also uses input from a selected choice application 802 shown in FIG. 6a to provide the platform with the structure of health insurance, such as equations describing the relationship of the deductible and the maximum out-of-pocket to the uncovered exposure. As shown in FIG. 6c, the platform displays to the user a catalogue of alternative policy descriptions 806. The user may select policies of interest from the catalogue 806 or describe policies that are not included in the catalogue. Note that, as shown in FIG. 6d, the user also provides a family description 810. The choice structure process operation produces probability distributions on uncovered exposure for each family member for each policy of interest.

In the family exposure process operation, the family choice platform uses input from the choice application 802, the catalogue of health insurance policy descriptions 806, the policies of interest to the user 808, the user's family description 810 and results from the choice structure process operation, the probability distributions on uncovered exposure for each family member for each policy of interest, to produce the side-by-side comparison of risk and total cost for each policy of interest 812, as shown in FIG. 6e.

Figure 7A:
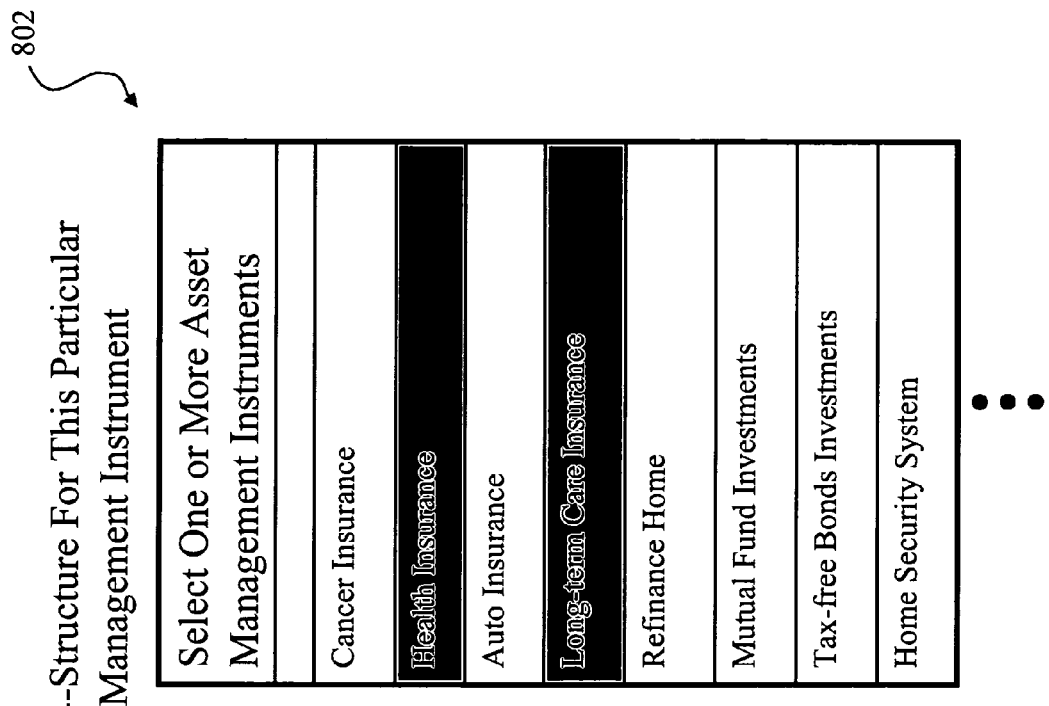

In the event that the user is concerned with reducing the total risk to the family or reducing the total cost of a particular level of protection, the user may select several types of asset risk management instruments from the choice application 802, as shown in FIG. 7a. That selection provides the platform with information about what risks are covered by the various asset risk management instruments in order that the relevant frequency distributions on exposure 804 shown in FIG. 7b may be selected from several databases by the platform, and combined as necessary.

Rather than selecting several alternatives from a single alternatives description catalogues, the user may select the alternative that describes the family's current coverage in each of several catalogues 806 shown in FIG. 7c. The family may be described via an interface 810 that is shown in FIG. 7d. Further, the side-by-side comparison of risk and cost shown in FIG. 7e is not necessarily for different alternatives regarding one type of asset risk management instrument, but rather it includes a side-by-side comparison of the risk and cost given the current protection provided by several asset risk management instruments.

As shown in FIG. 7c, the various applications may have a common interface specified by the family choice platform in order to facilitate the side-by-side comparison from several asset risk management instruments.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   causing execution of a risk management application for performing decision logic that present alternatives that relate to a risk exposure of a family of a user, the risk management application selected by the user from a plurality of different risk management applications each capable of performing different decision logic and using different databases;
   retrieving first information from a database in accordance with the decision logic; processing at least a portion of the first information in order to generate second information not originally included in the database, in accordance with the decision logic, the second information including risk exposure data for risk types associated with the risk management application selected by the user;
   receiving third information from the user in accordance with the decision logic utilizing a user interface;

processing the second information and the third information utilizing the decision logic for generating fourth information; and providing the fourth information to the user for enabling the user to make an informed selection among a plurality of supplier offers relating to management of the risk exposure of the family of the user;

wherein the executing, retrieving, receiving, and processing are carried out by a single software platform adapted to execute on an operating system and computer hardware;

wherein the single software platform includes an interface for interfacing the different risk management applications;

wherein the same single software platform is capable of accomplishing the executing, retrieving, receiving, and processing for different purposes by executing the different risk management applications in response to a selection thereof such that the executing, the retrieving, the receiving, and the processing are accomplished by the same single software platform for a first purpose in response to a selection of a first management application and the executing, the retrieving, the receiving, and the processing are accomplished by the same single software platform for at least a second purpose in response to a selection of at least a second management application;

wherein each of the different risk management applications is capable of performing the different decision logic and using the different databases, and the same single software platform is capable of driving a decision process through a sequence of decision-related operations to provide decision-relevant information to the user, where the sequence of decision-related operations are tailored to the risk management application selected by the user and the decision-relevant information is specific to the risk management application selected by the user such that different decision relevant-information is capable of being provided to the user for the different risk management applications in a common format via the same single software platform;

wherein the risk management application is selected from the different risk management applications by the user via a graphical user interface of the same single software platform;

wherein the same single software platform executes at least two of the different risk management applications in response to selection thereof by the user to obtain, for each of the at least two of the different risk management applications, results including cost and risk information based on current choices by the user, such that the cost and risk information is compared for each of the at least two of the different risk management applications;

wherein the same single software platform identifies optimal results among the results obtained from the at least two of the different risk management applications;

wherein the same single software platform further executes the at least two of the different risk management applications to obtain, for each of the at least two of the different risk management applications in response to selection thereof by the user, additional results including additional cost and risk information associated with alternatives other than the current choices by the user, such that the additional cost and risk information is compared for each of the at least two of the different risk management applications, and wherein the at least two of the different risk management applications are related to different categories of risk mitigation instruments.

2. The method of claim 1, wherein the platform includes a family or individual choice platform.

3. The method of claim 1, wherein the platform communicates with the applications through a standard interface protocol.

4. The method of claim 1, wherein the risk exposure relates to a risk including at least one of a health risk, automobile risk, life risk, financial risk, long term care, home security, and vehicle security.

5. The method of claim 1, wherein the risk exposure relates to risks including a health risk, automobile risk, life risk, financial risk, long term care, home security, and vehicle security.

6. The method of claim 1, wherein the first information from the database includes historical data.

7. The method of claim 1, wherein the first information from the database includes statistical data.

8. The method of claim 1, wherein the first information from the database relates to a plurality of the users.

9. The method of claim 8, wherein the plurality of the users form a family.

10. The method of claim 1, wherein the third information from the user relates to choice of an asset risk management instrument.

11. The method of claim 10, wherein the asset risk management instrument includes at least one of health insurance, automobile insurance, life insurance, financial investments, long term care insurance, home security devices, and vehicle security devices.

12. The method of claim 1, wherein the first information from the database relates to an available type of asset risk management instrument.

13. The method of claim 12, wherein the available type of asset risk management instrument includes at least one of health insurance, automobile insurance, life insurance, financial investments, long term care insurance, home security devices, and vehicle security devices.

14. The method of claim 1, wherein the second information and the third information is processed utilizing the decision logic for producing a comparison of a total annual likelihood of consequences.

15. The method of claim 1, wherein the second information and the third information is processed utilizing the decision logic for producing a comparison of a total annual expected consequences.

16. The method of claim 1, wherein the second information and the third information is processed utilizing the decision logic for determining whether a predetermined amount of resources will be exceeded.

17. The method of claim 1, wherein the second information and the third information is processed utilizing the decision logic for determining a likelihood that a predetermined amount of resources will be exceeded.

18. The method of claim 1, wherein the risk exposure data includes fifth information relating to uncovered costs to the family that are partially covered.

19. The method of claim 18, wherein the uncovered costs are associated with at least one of insurance, stop-losses, interest rate limitations, home security devices, and vehicle security devices.

20. The method of claim 1, wherein the third information received from the user includes information about the family of the user and the fourth information includes an assessment of a probability distribution of uncovered exposure for each member in the family of the user for each risk, such that any protection from risk provided by the risk management application selected by the user is removed from the probability distribution of uncovered exposure for each member in the family of the user for each risk.

21. The method of claim 20, wherein the removal is performed by convolving protection provided by each alternative of interest in at least one type of asset risk management instrument selected by the user based on the selection of the risk management application by the user, the risk management application selected by the user providing a description and equations for the structure of the at least one type of asset risk management instrument.

22. The method of claim 21, wherein the convolution results in an updated probability distribution of uncovered exposure for each member of the family of the user for each alternative of interest, the uncovered exposure including exposure uncovered that is included in the alternative of interest for the selected asset risk management instrument.

23. The method of claim 22, wherein the updated probability distribution of uncovered exposure for each member in the family of the user for each alternative of interest is combined into a family probability distribution of uncovered exposure for the family of the user, as a whole, for each alternative of interest.

24. The method of claim 23, wherein the family probability distribution of uncovered exposure for the family of the user for each alternative of interest is utilized for providing summary information for a health insurance policy of each alternative of interest, including an annual expected cost that is uncovered by the health insurance policy and a probability that an annual out-of-pocket cost is more than the family of the user can afford.

25. The method of claim 24, wherein a side-by-side comparison of risk and total cost for each alternative of interest is provided based on the summary information, including a side-by-side comparison of an annual total expected cost of the health insurance policy for each alternative of interest, the annual total expected cost including the annual expected cost that is uncovered by the health insurance policy plus a premium and the probability that the annual out-of-pocket cost is more than the family of the user can afford.

26. The method of claim 1, wherein the fourth information includes, for each of a plurality of insurance policies, a risk and total insurance cost for the user's family or for each member of the user's family.

27. The method of claim 26, wherein the insurance policies include at least one of health insurance policies and total long-term care insurance policies.

28. The method of claim 26, wherein the total insurance cost includes a premium and uncovered costs.

29. The method of claim 1, wherein the fourth information is provided via a user interface of the at least one platform.

30. A computer program product embodied on a computer readable medium, comprising:
  computer code for causing execution of a risk management application for performing decision logic that present alternatives that relate to a risk exposure of a family of a user, the risk management application selected by the user from a plurality of different risk management applications each capable of performing different decision logic and using different databases;
  computer code for causing retrieval of first information from a database in accordance with the decision logic;
  computer code for causing processing of at least a portion of the first information in order to generate second information not originally included in the database, in accordance with the decision logic, the second information including risk exposure data for risk types associated with the risk management application selected by the user;
  computer code for causing receipt of third information from the user in accordance with the decision logic utilizing a user interface;
  computer code for causing processing of the second information and the third information utilizing the decision logic for generating fourth information; and
  computer code for causing provision of the fourth information to the user for enabling the user to make an informed selection among a plurality of supplier offers relating to management of the risk exposure of the family of the user;
  wherein the executing, retrieving, receiving, and processing are carried out by a single software platform adapted to execute on an operating system and computer hardware;
  wherein the single software platform includes an interface for interfacing the different risk management applications;
  wherein the same single software platform is capable of accomplishing the executing, retrieving, receiving, and processing for different purposes by executing the different risk management applications in response to a selection thereof such that the executing, the retrieving, the receiving, and the processing are accomplished by the same single software platform for a first purpose in response to a selection of a first management application and the executing, the retrieving, the receiving, and the processing are accomplished by the same single software platform for at least a second purpose in response to a selection of at least a second management application;
  wherein each of the different risk management applications is capable of performing the different decision logic and using the different databases, and the same single software platform is capable of driving a decision process through a sequence of decision-related operations to provide decision-relevant information to the user, where the sequence of decision-related operations are tailored to the risk management application selected by the user and the decision-relevant information is specific to the risk management application selected by the user such that different decision relevant-information is capable of being provided to the user for the different risk management applications in a common format via the same single software platform;
  wherein the different applications each relate to asset risk management;
  wherein the computer program product is operable such that the risk management application is selected from the different risk management applications by the user via a graphical user interface of the same single software platform;
  wherein the same single software platform executes at least two of the different risk management applications in response to selection thereof by the user to obtain, for each of the at least two of the different risk management applications, results including cost and risk information based on current choices by the user, such that the cost and risk information is compared for each of the at least two of the different risk management applications;
  wherein the same single software platform identifies optimal results among the results obtained from the at least two of the different risk management applications;

wherein the same single software platform further executes the at least two of the different risk management applications to obtain, for each of the at least two of the different risk management applications in response to selection thereof by the user, additional results including additional cost and risk information associated with alternatives other than the current choices by the user, such that the additional cost and risk information is compared for each of the at least two of the different risk management applications, and wherein the at least two of the different risk management applications are related to different categories of risk mitigation instruments.

31. A system, comprising:

logic for causing execution of a risk management application for performing decision logic that present alternatives that relate to a risk exposure of a family of a user, the risk management application selected by the user from a plurality of different risk management applications each capable of performing different decision logic and using different databases;

logic for causing retrieval of first information from a database in accordance with the decision logic;

logic for causing processing of at least a portion of the first information in order to generate second information not originally included in the database, in accordance with the decision logic, the second information including risk exposure data for risk types associated with the risk management application selected by the user;

logic for causing receipt of third information from the user in accordance with the decision logic utilizing a user interface;

logic for causing processing of the second information and the third information utilizing the decision logic for generating fourth information; and logic for causing provision of the fourth information to the user for enabling the user to make an informed selection among a plurality of supplier offers relating to management of the risk exposure of the family of the user;

wherein the executing, retrieving, receiving, and processing are carried out by a single software platform adapted to execute on an operating system and computer hardware;

wherein the single software platform includes an interface for interfacing the different risk management applications;

wherein the same single software platform is capable of accomplishing the executing, retrieving, receiving, and processing for different purposes by executing the different risk management applications in response to a selection thereof such that the executing, the retrieving, the receiving, and the processing are accomplished by the same single software platform for a first purpose in response to a selection of a first management application and the executing, the retrieving, the receiving, and the processing are accomplished by the same single software platform for at least a second purpose in response to a selection of at least a second management application;

wherein each of the different risk management applications is capable of performing the different decision logic and using the different databases, and the same single software platform is capable of driving a decision process through a sequence of decision-related operations to provide decision-relevant information to the user, where the sequence of decision-related operations are tailored to the risk management application selected by the user and the decision-relevant information is specific to the risk management application selected by the user such that different decision relevant-information is capable of being provided to the user for the different risk management applications in a common format via the same single software platform;

wherein the different applications each relate to asset risk management;

wherein the system is operable such that the risk management application is selected from the different risk management applications by the user via a graphical user interface of the same single software platform;

wherein the same single software platform executes at least two of the different risk management applications in response to selection thereof by the user to obtain, for each of the at least two of the different risk management applications, results including cost and risk information based on current choices by the user, such that the cost and risk information is compared for each of the at least two of the different risk management applications;

wherein the same single software platform identifies optimal results among the results obtained from the at least two of the different risk management applications;

wherein the same single software platform further executes the at least two of the different risk management applications to obtain, for each of the at least two of the different risk management applications in response to selection thereof by the user, additional results including additional cost and risk information associated with alternatives other than the current choices by the user, such that the additional cost and risk information is compared for each of the at least two of the different risk management applications, and wherein the at least two of the different risk management applications are related to different categories of risk mitigation instruments.

* * * * *